United States Patent [19]
Reginato et al.

[11] 3,978,031
[45] Aug. 31, 1976

[54] PROCESS FOR THE POLYMERIZATION OF OLEFINS AND CATALYTIC PRODUCTS

[75] Inventors: Luigi Reginato, Brussels; Charles Bienfait, Vilvoorde; Jacques Stevens, Braine L'Alleud, all of Belgium

[73] Assignee: Solvay & Cie, Belgium

[22] Filed: Oct. 25, 1974

[21] Appl. No.: 518,198

Related U.S. Application Data

[63] Continuation of Ser. No. 186,764, Oct. 5, 1971, abandoned.

[30] Foreign Application Priority Data

Oct. 8, 1970  Luxemburg .......................... 61838

[52] U.S. Cl. .................... 526/352; 252/429 C; 252/430; 252/441; 252/442; 526/154
[51] Int. Cl.² ...................... C08F 4/02; C08F 10/02
[58] Field of Search ............... 252/429 C, 430, 441, 252/442; 260/88.2, 93.7, 94.9 DA

[56] References Cited
UNITED STATES PATENTS

| | | |
|---|---|---|
| 2,825,721 | 3/1958 | Hogan et al. ................ 260/94.9 D |
| 3,158,594 | 11/1964 | Weil et al. .................... 260/94.9 D |
| 3,166,542 | 1/1965 | Orzechowski et al. ....... 260/94.9 DA |
| 3,351,623 | 11/1967 | Walker et al. ................ 260/94.9 D |
| 3,513,150 | 5/1970 | Matsuiera et al. .......... 260/94.9 DA |
| 3,646,000 | 2/1972 | Horvath ....................... 260/94.9 D |
| 3,658,722 | 4/1972 | Delbouille et al. .......... 260/94.9 DA |

Primary Examiner—Edward J. Smith
Attorney, Agent, or Firm—Pennie & Edmonds

[57] ABSTRACT

This invention relates to novel catalysts and cocatalysts for use in the polymerization and copolymerization of α-olefins, to a process of using such catalysts to polymerize and copolymerize α-olefins, and to a process of making such cocatalysts. The α-olefins are polymerized or copolymerized in the presence of a catalytic amount of a catalyst comprising an organometallic compound of a metal of Groups I a, II a, II b, III a, or IV a of the Periodic Table and a cocatalyst comprising the reaction product of an activated halogenated alumina having an atomic ratio of halogen/aluminum of from 0.1 to 1 and a derivative of a transition metal.

10 Claims, No Drawings

PROCESS FOR THE POLYMERIZATION OF OLEFINS AND CATALYTIC PRODUCTS

This is a continuation of application Ser. No. 186,764, filed Oct. 5, 1971, now abandoned.

BACKGROUND OF THE INVENTION

It is known that one can use for the low-pressure polymerization of olefins catalytic systems containing a halogenated derivative of a transition metal and an organometallic compound. It is also known that the derivative of the transition metal can be fixed onto an oxide support such as an alumina, an aluminosilicate, a silica or a titanium oxide. Such catalysts and methods of making them have been described in British Pat. No. 823,024, U.S. Pat. Nos. 3,166,542, 3,216,982 and 3,506,633 and French Pat. Nos. 1,349,864 and 1,473,568. According to these processes the fixing of the derivative of a transition metal is carried out by chemical reaction from a solution in a hydrocarbon or from vapors of the derivative of the transition metal. The conditions of operation are selected so as to bring about the complete evacuation of the hydrogen halide which is formed during the course of the fixation reaction. The catalytic systems obtained by this mode of operation have a very low productivity, of the order of a few tens of grams of polymer per gram of catalyst.

A copending application by applicants herein, U.S. Ser. No. 153,788, filed June 16, 1971, sets forth an improved process for catalyzing olefins with certain activated alumina cocatalysts which results in greatly increased productivity. However, even greater productivity is desired, and in addition it is desired that the polymers formed have a lower melt index.

SUMMARY OF THE INVENTION

The present invention provides novel catalysts and cocatalysts and processes as hereinafter set forth which result in high productivity of polymers.

Briefly stated, the present invention relates to a process for the polymerization and copolymerization of α-olefins which comprises contacting the olefins, at a temperature and at a pressure sufficient to initiate the reaction, with a catalytic amount of a novel catalyst comprising an organometallic compound of a metal of Groups I a, II a, II b, III a and IV a of the Periodic Table and a novel cocatalyst obtained by reacting a halogenated alumina having an atomic ratio of halogen/aluminum of from 0.1 to 1 with a derivative of a transition metal. The invention also comprises the method of making such cocatalyst by forming an activated halogenated alumina and reacting it with a transition metal derivative as more fully described below.

DETAILED DESCRIPTION

The halogenated aluminas used within the framework of the present invention are preferably characterized by an atomic ratio of halogen to aluminum of between 0.01 and 1. The best results are obtained with halogenated aluminas in which the atomic ratio of halogen to aluminum is between 0.06 and 0.30 and more particularly between 0.10 and 0.15.

Numerous methods may be employed for preparing these halogenated aluminas. As starting products there can be used hydrates of alumina of various crystalline forms, amorphous hydrates of alumina, activated aluminas of various crystalline forms as well as amorphous aluminas. However, the best results are obtained from activated aluminas obtained by the pyrolysis of crystallized hydrates of alumina.

Various hydrates of alumina are used for preparing activated aluminas. One may mention in particular α-trihydrates (hydrargilite or gibbsite) and β-trihydrates (bayerite or nordstandite) and α-monohydrates (boehmite) and β-monohydrates (diaspore).

When the trihydrates are heated to a temperature higher than about 200°C., a part of the water of hydration is released and a fraction of the trihydrate is converted into monohydrate. Above about 400°C., the monohydrates also become unstable. They decompose and give various crystalline forms of activated aluminas known as transition aluminas. The nature of these forms depends in the main on the form of the original hydrate, the temperature and methods of heating. Above approximately 1100°C., the only stable form is α-alumina, whatever may be the nature of the original hydrate.

In order to prepare the halogenated aluminas of the invention, one preferably uses activated aluminas obtained by the pyrolysis of alumina hydrates at a temperature between 500° and 900°C. The best results are obtained when the pyrolysis is carried out between 550° and 800°C., and more particularly between 600° and 700°C.

The pyrolysis may be carried out in air, nitrogen, or any other atmosphere which is inert in relation to the alumina. The pressure is not critical, but it is preferred to operate at atmospheric pressure or possibly at reduced pressure for reasons of convenience. The duration of pyrolysis also is not critical. Generally speaking, it is greater than one hour and preferably less than 4 hours. The continuance of the treatment beyond 24 hours is generally of no interest since it is unnecessary and commercially undesirable.

The activated aluminas preferably used within the framework of the present invention present a high degree of internal porosity. In other words, the volume of the pores represents an important proportion of the total volume of the particles. Generally speaking the internal porosity is characterized by the ratio of the volume of the pores to the weight of the material. One preferably uses activated aluminas whose internal porosity is greater than 0.3 cm$^3$/g and more particularly greater than 0.7 cm$^3$/g. The best results are obtained with activated aluminas of an internal porosity greater than 1 cm$^3$/g. These activated aluminas with a high internal porosity generally present a specific surface area of more than 100 sq. m. per gram, more often than not of the order of 250 to 400 sq. m. per gram.

While the dimension of the alumina particles is not critical, for reasons of convenience, it is preferable to use particles whose mean diameter is between 1 and 500 μ and preferably between 40 and 200 μ. Furthermore, the morphology of the polymer and its free-flowing characteristics are improved when one uses aluminas in particles of regular shape. It is preferred to use aluminas whose particle size is within a narrow range distribution so as to obtain grains of polymer whose particle size is also within a narrow range distribution. Excellent results are obtained with cocatalysts having particles of activated alumina whose mean diameter is in the vicinity of 100 μ, the shape of which is very regular and whose particle size distribution is very close.

Cocatalysts which are particularly active in polymerization are prepared from activated alumina having an internal porosity of the order of 1.1 cm³/g. These aluminas are obtained by the pyrolysis of α-alumina monohydrate (boehmite) at 650°–700°C. for 4 to 24 hours.

The halogenated aluminas used within the framework of the present invention are prepared by subjecting the initial products (aluminas or alumina hydrates) to a halogenation treatment.

All the known halogenating agents may be used to carry out this treatment. Among those most frequently employed and that can be used are halogens in the elemental state (for example $F_2$ and $Cl_2$); hydrogen halides (for example HCl and HBr); halogenomethanes ($CCl_3H$ and $CCl_4$, and the like); oxyhalides of non-metals ($SO_2Cl_2$.$SOCl_2$, $NOCl_2$, $COCl_2$, $POCL_3$, and the like); halides of non-metals ($PCl_3$ and $PCl_5$, and the like); and halides of metals and ammonium (KF, KF.HF, $NH_4F$, $NH_4F$.HF and $NH_4Cl$, and the like).

The halogenation treatment may be carried out by any process which is compatible with the properties of the agent employed. Thus, one may use the halogenating agent in the gaseous state, pure or in admixture with an inert gas; in the dissolved state, in solution in water or another solvent; or in the solid state, by solid/solid reaction or by the evolution of a volatile halogenated compound.

The temperature at which the treatment is carried out is selected according to the concentration of halogen which it is desired to obtain, the reactivities and the method of treatment. Generally speaking, a temperature above ambient temperature is used but below that exceeding the pyrolysis temperature when one uses an activated alumina.

The duration of the treatment and the quantity of halogenating agent to be used are also selected according to the factors defined above.

After the treatment the halogenated aluminas may be subjected to an activation treatment. This treatment is essential when one uses alumina hydrates pyrolyzed at less than 400°C. or unpyrolyzed as starting products and when one carries out the halogenation treatment in the presence of water.

This activation treatment consists in heating the products of the halogenation treatment to a temperature of between 300° and 900°C. The best results are obtained when the temperature is between 400° and 700°C. and more particularly between 450° and 550°C.

The activation treatment may be carried out in the air, nitrogen or any other atmosphere which is inert in relation to the alumina. The pressure is not critical; however, it is preferable to operate at atmospheric pressure or possibly at reduced pressure for reasons of convenience. The duration of the treatment is generally greater than 1 hour and preferably greater than 4 hours. The continuation of the treatment beyond 24 hours is generally not necessary and of no commercial interest.

It is convenient to combine the activation treatment with the halogenation treatment. In this case the two treatments are carried out preferably at the same temperature. The halogenating agent may, for example, be introduced at the beginning of the combined treatment and then be replaced by an inert medium without transferring the solid to a different container.

This mode of procedure is particularly advantageous when using a solid halogenating agent which is decomposable into volatile products without any solid residue, such as $NH_4F$.HF or $NH_4F$. The agent is mixed with the initial product and the mixture is brought to the treatment temperature which must be sufficiently high to bring about the decomposition of the agent. After the disappearance of the latter, one continues the heating so as to bring about the activation.

Naturally, the conditions of execution of the halogenation treatment and possibly the activation treatment must be selected so as to give in the end halogenated aluminas which possess the atomic ratio of halogen/aluminum which is desired.

All the halogenated aluminas are suitable for the preparation of the cocatalysts of the invention, whatever may be the nature of the halogen (fluorine, chlorine, bromine or iodine). However, it is preferable to use fluorinated aluminas because they make it possible to prepare the most productive catalytic elements.

The cocatalysts of the present invention are obtained by reacting a halogenated alumina with a derivative of a transition metal of Groups IV b, V b and VI b of the Periodic Table. This derivative is preferably selected from among the compounds of titanium, zirconium, vanadium and chromium. The best results are obtained with the derivatives of titanium.

As derivative, one may use the halides, oxyhalides, alkoxyhalides, oxyalkoxides and alkoxides. When one uses halogenated compounds, it is preferable to use brominated and chlorinated derivatives such as $TiCl_4$, $TiBr_4$, $VCl_4$, $VOCl_3$, $VOBR_3$, $CrO_2Cl_2$, $Ti(OC_2H_5)_3Cl$, $Ti(OiC_3H_7)_3Cl$, $Ti(OC_2H_5)_2Cl_2$ and $Ti(OiC_3H_7)Cl_3$. When using compounds containing alkoxide radicals, they are preferably selected from among those whose alkoxide radicals, whether straight or branched, contain from 1 to 20 carbon atoms and more particularly from 1 to 10 carbon atoms each, such as $Ti(OiC_4H_9)_4$, $Ti(OiC_3H_7)_3Cl$ and $VO(OiC_3H_7)_3$. The best results are obtained with $TiCl_4$.

The method by which the reaction is carried out between the halogenated alumina and the derivative is not critical. The derivative may be used in the form of a gas or vapor which may be diluted with an inert gas, in the liquid form or in the form of a solution. As solvent, one generally uses the diluents usually employed in the low-pressure polymerization of olefins. A particularly convenient method of proceeding consists in bringing the halogenated alumina into suspension in the pure derivative which is brought to and maintained in the liquid state. One may also carry out the reaction by washing the halogenated alumina with the derivative when the latter is liquid under the reaction conditions.

The temperature and the pressure at which the reaction is carried out are not critical. Generally speaking one operates for reasons of convenience at a temperature between 0° and 300°C. and preferably at between 20° and 150°C.

The halogenated alumina and the derivative are maintained in the presence of one another for a period which is sufficient for a chemical fixing of the derivative onto the alumina to take place. Generally speaking, this fixing is achieved at the end of an hour.

After the reaction the cocatalyst is collected separately. It may be extracted by means of the derivative which was used in the reaction. It is then washed with an inert hydrocarbon solvent such as pentane, hexane or cyclohexane so as to eliminate the excess of derivative which has not been chemically fixed onto the halogenated alumina.

The elementary analysis of the catalytic element which has undergone the treatment by washing shows a content of metal of Groups IV b, V b and VI b which is greater than 2 mg/g and is generally greater than 5 mg/g. One may conclude from this that there has in fact been a chemical reaction between the halogenated alumina and the derivative. Furthermore, the elementary analysis shows that the total quantity of halogen fixed chemically onto the cocatalyst is such that the atomic ratio of halogen/metal of groups IV b, V b and VI b is greater than the valency of this metal, taking into account unhalogenated substituents which it may carry.

This quantity also comprises the halogen of the halogenated alumina and also the halogen which is possibly fixed during the reaction with the derivative if the latter is halogenated. The best results are obtained with cocatalysts whose atomic ratio of halogen to metal of Groups IV b, V b and VI b is between 6 and 30 and preferably between 10 and 20.

The catalysts according to the present invention also include an organometallic compound of a metal of Groups I a, II a, II b, III a or IV a of the Periodic Table, such as the organic compounds of lithium, magnesium, zinc, aluminum or tin known in this polymerization art. The best results are obtained with alkyl aluminums.

One may use totally alkylated compounds whose alkyl chains generally contain 1 to 20 carbon atoms and are straight or branched, such as for example n-butyl lithium, diethyl magnesium, diethyl zinc, trimethyl aluminum, triethyl aluminum, tetra-ethyl tin, and tetrabutyl tin. However, one prefers to use the trialkyl aluminums whose alkyl radicals contain from 4 to 12 carbon atoms, such as tri-isobutyl aluminum, tri-octyl aluminum and tridecyl aluminum. One may also use alkyl metal hydrides in which the alkyl radical also contains from 1 to 20 carbon atoms such as diisobutyl aluminum hydride and trimethyl tin hydride. Also suitable are the alkyl halides of metals in which the alkyl radicals also contain from 1 to 20 carbon atoms, such as ethyl aluminum sesquichloride, diethyl aluminum chloride and diisobutyl aluminum chloride.

Finally, one may also use organoaluminum compounds obtained by reacting trialkyl aluminums or dialkyl aluminum hydride whose radicals contain from 1 to 20 carbon atoms with diolefins containing 4 to 20 carbon atoms, and more particularly the compounds which are generally known as isoprenyl aluminums.

The process of the invention is applied to the polymerization of $\alpha$-olefins with a terminal unsaturation whose molecule contains 2 to 18 and preferably 2 to 6 carbon atoms, such as ethylene, propylene, butene-1, 4-methylpentene-1 and hexene-1. It is also applied to the co-polymerization of these olefins with one another as well as with diolefins preferably containing from 4 to 18 carbon atoms. These diolefins may be unconjugated aliphatic diolefins such as hexadiene-1,4, unconjugated monocyclic diolefins such as 4-vinylcyclohexene, 1,3-divinylcyclohexane, cycloheptadiene-1,4 or cyclooctadiene-1,5 alicyclic diolefins having an endocyclic bridge such as dicyclopentadiene or norbornadiene and conjugated aliphatic diolefins such as butadiene and isoprene.

The process of the invention is applied particularly well to the manufacture of homopolymers of ethylene and copolymers containing at least 90 moles per cent and preferably 95 moles per cent of ethylene.

The polymerization may be carried out according to any known process, such as in solution or in suspension in a hydrocarbon solvent or diluent or in the gaseous phase. For processes in solution or in suspension one uses inert solvents or diluents analogous to those used for the washing of the catalytic element. These are preferably aliphatic or cycloaliphatic hydrocarbons such as butane, pentane, hexane, heptane, cyclohexane, methylcyclohexane and mixtures thereof. It is also possible to carry out the polymerization in the monomer or one of the monomers maintained in the liquid state.

The polymerization pressure is generally between atmospheric pressure and 100 kg/cm$^2$, preferably between 5 and 50 kg/cm$^2$. The temperature is generally chosen between 20° and 120°C. and preferably between 60° and 100°C. The polymerization may be carried out continuously or discontinuously.

The organometallic compound and the cocatalyst may be added separately to the polymerization medium. It is also possible to bring them into contact at a temperature between −40° and 80°C., for a period which may range up to 2 hours before introducing them into the polymerization reactor. One may also bring them into contact in several stages or add a part of the organometallic compound before the reactor or again add several different organometallic compounds.

The total quantity of organometallic compounds used is not critical and is generally between 0.02 and 50 mmoles per dm$^3$ of solvent, diluent or volume of reactor and preferably between 0.2 and 5 mmoles/dm$^3$.

The quantity of cocatalyst used is determined according to the content of metal of Groups IV b, V b and VI b in the element. This is usually chosen so that the concentration is between 0.001 and 2.5 and preferably between 0.01 and 0125 m.g. at. of metal per dm$^3$ of solvent, diluent or reactor volume.

The ratio of the quantities of organometallic compound and cocatalyst is also not critical, provided, however, the organometallic compound is present in a molat excess in relation to the transition metal present in the cocatalyst. It is generally chosen in such a way that the ratio of organometallic compound to metal of Groups IV b, V b or VI b expressed in moles/g.at. is greater than 2 and preferably greater than 10.

The molecular weight of the polymers manufactured according to the process of the invention may be regulated by the addition to the polymerization medium of one or more agents for modifying the molecular weight, such as hydrogen, zinc or diethyl cadmium, alcohols or carbon dioxide.

The specific gravity of the homopolymers manufactured according to the process of the invention may also be regulated by the addition to the polymerization medium of an alkoxide of a metal of Groups IV b and Vb of the Periodic Table, not fixed onto a catalyst support. Thus, one can produce polyethylenes with specific gravities intermediate between those of polyethylenes manufactured by a high-pressure process and those of the classic high-density polyethylenes.

Among the alkoxides which are suitable for this regulation are those of titanium and vanadium whose radicals contain 1 to 20 carbon atoms each are particularly useful. One may mention among these Ti(OCH$_3$)$_4$, Ti(OC$_2$H$_5$)$_4$, Ti[OCH$_2$CH(CH$_3$)$_2$]$_4$, Ti(OC$_8$H$_{17}$)$_4$, Ti(OC$_{16}$H$_{33}$)$_4$ and VO(OC$_2$H$_5$)$_3$.

The process of the invention makes it possible to manufacture polyolefins with remarkably high productivities. Thus, in the homopolymerization of ethylene, the productivity expressed in g of polyethylene per g of catalytic element exceeds 1000. The cocatalysts prepared from fluorinated aluminas are particularly productive. The productivity may reach 1200 and even 1500 g polyethylene per g of cocatalyst.

In addition, since the content of metal of Group IV b, V b and VI b of the cocatalyst is very low (lower then 20 mg/g in most of the cases), the concentration of catalytic residues which are troublesome for the use of the polymers is negligible. For this reason, the polymers do not have to be purified. This eliminates the need to deash the polymers to remove these residues. Such operation is very involved and costly.

Finally, the polyolefins manufactured by the process of the present invention are characterized by a particularly high mean molecular weight and consequently by a melt index which is particularly low. Polyethylenes are obtained having a melt index of less than 0.5, even while carrying out the polymerization at elevated temperature and obtaining high productivities. These polyethylenes are particularly suitable for extrusion and blow-molding because they permit high speed extrusion without melt fracture. Articles made of these polyethylenes possess a remarkably high resistance to stress cracking.

The invention will be further described in connection with the following examples which are set forth for purposes of illustration only and are not to be construed as limiting the scope thereof in any manner.

EXAMPLE 1

An α-alumina monohydrate (boehmite) sold under the trademark "KETJEN Grade B" was heated to a temperature of 700°C and maintained at that temperature for 16 hours.

100 g of activated alumina thus prepared were mixed with 12.5 g of $NH_4F$ and the mixture brought to a temperature of 500°C and maintained at this temperature for 4 hours to form a fluorinated alumina whose aluminium content was 509 mg/g and whose fluorine content was 42 mg/g, thus corresponding to an atomic ration of F/Al of approximately 0.12. The specific surface area was 260 sq. m. per gram. 5 g of this fluorinated alumina was suspended in 25 $cm^3$ of $TiCl_4$ and the whole is brought to 130°C with strong agitation for one hour. The solid reaction product was separated, washed with hexane until all traces of chlorine had disappeared, and the resultant supported cocatalyst dried in a current of dry nitrogen.

The elementary analysis of the cocatalyst thus formed showed that it contained 11 mg/g of Ti, 36 mg/g of chlorine and 40 mg/g of fluorine. The atomic ratio F+Cl/Ti was approximately 13.5.

79.5 mg of the cocatalyst was suspended in 500 $cm^3$ of hexane in a 1500-$cm^3$ stainless steel reactor equipped with a blade-type agitator to which reactor 100 mg of triisobutyl aluminum was then added. The temperature was brought to 85°C and ethylene was introduced under a partial pressure of 10 $kg/cm^2$ and hydrogen introduced under a partial pressure of 4 $kg/cm^2$. The polymerization was continued for 1 hour while maintaining the partial ethylene pressure constant by the continuous introduction of ethylene.

After degassing of the autoclave, 92 g of polyethylene were collected. This corresponded to an hourly productivity of the catalyst of 1220 g polyethylene/g cocatalyst. The specific activity of the cocatalyst based on the weight of titanium used and at 1 $kg/cm^2$ of ethylene was 10,500 g of polyethylene/g. Ti.h.kg./$cm^2$ $C_2H_4$.

The polyethylene obtained possessed a melt index measured under a high load of 0.15g/10 mins. (measured in accordance with ASTM Standard D 1238-57 T).

EXAMPLE 2

This example is given for purposes of comparison.

5 g of activated alumina which was not subjected to the fluorination treatment were suspended in 25 $cm^3$ of $TiCL_4$ and a cocatalyst prepared by the same procedure as set forth in Example 1. The elementary analysis of this cocatalyst showed that it contained 17 mg/g of titanium and 78 mg/g of chlorine. The atomic ratio of Cl/Ti was therefore 6.2. 75 mg of this cocatalyst were suspended in 500 $cm^3$ of hexane and the polymerization of ethylene carried out as in Example 1.

51 g of polyethylene were collected having a high-load melt index of 0.65 g/10 mins. The hourly productivity was 680 g polyethylene/g cocatalyst and the specific activity was 3990 g polyethylene/g. Ti.h.kg/$cm^2$ $C_2H_4$.

It will be seen that the catalysts of the invention have a productivity which is practically double that of the catalysts prepared under identical conditions from identical aluminas which have not been halogenated. Furthermore, all conditions being equal, they make it possible to prepare polymers with a lower melt index. Finally, the content of harmful catalytic residue (metals of groups IVb, Vb and VIb) is reduced by more than 60% as is shown by the values for the specific activity. It is in fact the derivatives of these metals which give rise to undesirable colorations in the finished objects and which cause the corrosion of the apparatus used for moulding the polymers.

EXAMPLES 3 to 9

These examples were carried out under the same conditions and with the same materials as set forth in Example 1 except as regards the specific conditions for each test mentioned in Table 1 below. This table also gives the results of the polymerization.

TABLE I

| Special Conditions | Ex. 3 | Ex. 4 | Ex. 5 | Ex. 6 | Ex. 7 | Ex. 8 | Ex. 9 |
|---|---|---|---|---|---|---|---|
| Temperature of pyrolysis of alumina monohydrate, °C | 600 | 700 | 700 | 600 | 600 | 700 | 600 |
| Weight of $NH_4F$ used, g | 5.5 | 10 | 10 | 12.5 | 16 | 20 | 37 |
| Al content of the fluorinated alumina, mg/g | 490 | 503 | 518 | 497 | 495 | 508 | 456 |
| F content of the fluorinated alumina, mg/g | 24 | 35 | 38 | 41 | 44 | 53 | 81 |
| Atomic ratio F/Al of the fluorinated alumina | 0.07 | 0.10 | 0.11 | 0.12 | 0.13 | 0.15 | 0.25 |
| Ti content of the cocatalyst mg/g | 19 | 11 | 8.4 | 8.9 | 11 | 7.2 | 8 |
| Cl content of the cocatalyst mg/g | 66 | 38 | 29 | 38 | 37 | 26 | 24 |
| F content of the cocatalyst, mg/g | 19 | 28 | 40 | 46 | 39 | 48 | 67 |
| Atomic ratio F + Cl/Ti of the co- | | | | | | | |

TABLE I-continued

| Special Conditions | Ex. 3 | Ex. 4 | Ex. 5 | Ex. 6 | Ex. 7 | Ex. 8 | Ex. 9 |
|---|---|---|---|---|---|---|---|
| catalyst | 8 | 11 | 16 | 19 | 13.5 | 21.5 | 25.5 |
| Weight of the cocatalyst used, g | 75 | 79.5 | 79.5 | 75 | 75 | 79.5 | 75 |
| Weight of polyethylene collected, g | 58 | 78 | 82 | 90 | 85 | 78 | 62 |
| Hourly productivity g. PE/g cocatalyst | 750 | 1040 | 1100 | 1200 | 1130 | 1040 | 800 |
| Specific activity g. PE/h.g.Ti kg/cm$^2$ C$_2$H$_4$ | 4100 | 8900 | 12500 | 13500 | 10500 | 13500 | 10500 |
| Melt index under heavy load g/10 mins. | 0.30 | 0.23 | 0.15 | 0.16 | 0.11 | 0.13 | 0.08 |

These examples show that the hourly productivity of the catalyst passes through a maximum for values of the atomic ratio F/Al of the fluorinated alumina of between 0.10 and 0.15. Experiments 3 to 9, which should be compared with the reference experiment 2, also show that for values of this ratio less than 0.10 and greater than 0.15 the hourly productivity is still better than that obtained with the cocatalyst prepared from non-halogenated alumina.

EXAMPLES 10 to 12

These examples were carried out under the same conditions and with the same materials as set forth in Example 1, except as regards the special conditions mentioned in Table II which follows. This table also gives the results of the polymerization.

TABLE II

| Special Conditions | Ex. 10 | Ex. 11 | Ex. 12 |
|---|---|---|---|
| Temperature of pyrolysis of alumina monohydrate, °C | 600 | 600 | 600 |
| Weight of NH$_4$F used, g | 16 | 12.5 | 20 |
| Temperature of treatment of mixture °C | 350 | 400 | 600 |
| Al content of the fluorinated alumina, mg/g | 486 | 479 | 483 |
| F content of the fluorinated alumina, mg/g | 40 | 40 | 42 |
| Atomic ratio F/Al of the fluorinated alumina | 0.12 | 0.12 | 0.12 |
| Ti content of the cocatalyst, mg/g | 15 | 15 | 9 |
| Cl content of the cocatalyst mg/g | 54 | 49 | 26 |
| F content of the cocatalyst, mg/g | 50 | 31 | 59 |
| Atomic ratio F + Cl/Ti of the cocatalyst | 13.5 | 9.5 | 18.5 |
| Weight of cocatalyst used, g | 75 | 79.5 | 79.5 |
| Weight of polyethylene collected, g | 56 | 67 | 80 |
| Hourly productivity g. PE/g cocatalyst | 750 | 900 | 1060 |
| Specific activity g. PE/h.g. Ti kg/cm$^2$C$_2$H$_4$ | 3500 | 5500 | 11000 |
| Melt index under heavy load g/10 mins | 0.23 | 0.17 | 0.13 |

These experiments must be compared with those of Example 6 where the temperature of the treatment of the mixture was 500°C. They show that for the same atomic ratio F/Al of the fluorinated alumina, the highest hourly productivities are reached in the temperature zone between 400° and approximately 700°C with a maximum around 500°C.

EXAMPLES 13 to 17

These examples are carried out under the same conditions and with the same materials as set forth in Example 1 except as regards the special conditions mentioned in Table III which follows. This table also gives the results of the polymerization.

TABLE III

| Special Conditions | Ex. 13 | Ex. 14 | Ex. 15 | Ex. 16 | Ex. 17 |
|---|---|---|---|---|---|
| Temp. of pyrolysis of alumina monohydrate °C | 700 | 700 | 600 | 700 | 700 |
| Weight of NH$_4$F used, g | 10 | 12.5 | 25 | 10 | 10 |
| Al content of the fluorinated alumina, mg/g | 503 | 509 | 490 | 503 | 503 |
| F content of the fluorinated alumina, mg/g | 35 | 42 | 82 | 35 | 35 |
| Atomic ratio F/Al of the fluorinated alumina | 0.10 | 0.12 | 0.24 | 0.10 | 0.10 |
| Ti content of the cocatalyst, mg/g | 11 | 11 | 7 | 11 | 11 |
| Cl content of the cocatalyst, mg/g | 38 | 36 | 27 | 38 | 38 |
| F content of the cocatalyst, mg/g | 28 | 40 | 66 | 28 | 28 |
| Atomic ratio F + Cl/Ti of the cocatalyst | 11 | 13.5 | 29 | 11 | 11 |
| Nature of organo-metallic compound | Al(C$_2$H$_5$)$_3$ | Al(C$_8$H$_{17}$)$_3$ | Al(C$_{16}$H$_{33}$)$_3$ | Al iso-prenyl | Al(C$_2$H$_5$)$_2$Cl |
| Weight of organo-metallic compound used, mg | 100 | 300 | 280 | 140 | 120 |
| Weight of cocatalyst used, mg | 140 | 140 | 60 | 140 | 140 |
| Partial hydrogen pressure, kg/cm$^2$ | 14 | 14 | 4 | 14 | 14 |
| Weight of polyethylene | | | | | |

TABLE III-continued

| Special Conditions | Ex. 13 | Ex. 14 | Ex. 15 | Ex. 16 | Ex. 17 |
|---|---|---|---|---|---|
| collected, g | 50 | 124 | 44 | 59 | 31 |
| Hourly productivity, g. PE/g. cocatalyst | 360 | 890 | 750 | 420 | 220 |
| Specific activity g. PE/h.g. Ti kg/cm$^2$ C$_2$H$_4$ | 3000 | 8000 | 10500 | 4000 | 2000 |
| Melt index under heavy load g/10 mins. | 2.83 | 2.23 | 0.10 | 1.57 | 1.87 |

The aluminium isoprenyl used in experiment 16 was the product of the reaction of triisobutyl aluminium with isoprene. It is characterized by a ratio between the hydrolysis products containing 5 carbon atoms and those containing 4 carbon atoms.

Experiments 1, 6, 13, 14, 15, 16 and 17 show that the process of the invention gives polyethylenes with a melt index which is very low whatever the nature of the alkyl aluminium used and despite a high concentration of molecular weight modifier.

Experiments 1, 6, 13, 14 and 15 show that the trialkyl aluminiums whose alkyl radicals have a long chain give the best results from the point of view of the hourly productivity and the specific activity of the catalyst.

EXAMPLE 18

An α-alumina monohydrate (boehmite) sold under the trademark "KETJEN Grade B" was heated to a temperature of and maintained at 600°C for 16 hours.

100 g of the activated alumina thus prepared was brought into suspension in one liter of a 30% aqueous solutions of NH$_4$F. After treatment for one hour it was filtered, the fluorinated alumina washed 3 times with water, and then dried in vacuo. The fluorinated alumina thus dried was brought to 600°C and maintained at this temperature for 4 hours. There was obtained a fluorinated alumina whose aluminium content was 482 mg/g and whose fluorine content was 51 mg/g, corresponding to an atomic ratio F/Al of approximately 0.15.

5 g of this fluorinated alumina was suspended in 25 cm$^3$ of TiCl$_4$ and the whole brought to 130°C with vigorous agitation for 1 hour. The solid product of the reaction was separated, washed with hexane until all traces of TiCl$_4$ had disappeared, and then dried in a current of dry nitrogen to form a supported cocatalyst. The elementary analysis of the cocatalyst thus formed showed that it contained 9 mg/g if Ti, 45 mg/g of Cl and 53 mg/g of F corresponding to an atomic ratio F+Cl/Ti of approximately 22.

75 mg. of the cocatalyst was suspended in 500 cm$^3$ of hexane in a 1500-cm$^3$ stainless steel reactor equipped with a blade-type agitator to which reactor 100 mg of triisobutyl aluminium was then added. The temperature was brought to 85°C and ethylene introduced under a partial pressure of 10 kg/cm$^2$ and hydrogen under a partial pressure of 4 kg/cm$^2$. The polymerization was continued for one hour and the partial ethylene pressure maintained constant by continuous introduction of ethylene.

After degassing of the autoclave, 112 g of polyethylene were collected. This corresponded to an hourly productivity of 1500 g polyethylene/g cocatalyst and a specific activity of 21,500 g polyethylene/hr.g-.Ti.kg/cm$^2$ C$_2$H$_4$. The polyethylene thus manufactured was characterized by a high-load melt index of 0.08.

EXAMPLE 19

5 g of fluorinated alumina prepared as set forth in Example 1 was suspended in 25 cm$^3$ of VOCl$_3$ at a temperature of 125°C which was maintained constant and it was agitated for one hour. The solid reaction product was separated, washed with hexane until all traces of chlorine had disappeared, and then dried under a current of dry nitrogen. The elementary analysis of the cocatalyst thus formed showed that it contained 17 mg/g of vanadium, 36 mg/g of chlorine and 45 mg/g of fluorine. The atomic ratio F+Cl/V was approximately 10. 200 mg of the cocatalyst were suspended in 500 cm$^3$ of hexane and the polymerization carried out as set forth in Example 1 except that the partial ethylene pressure was 8 kg/cm$^2$ and the partial hydrogen pressure 15 kg/cm$^2$.

15 g of polyethylene were collected having a melt index equal to 0.70 g/10 minutes. The hourly productivity was 75 g polyethylene/g. cocatalyst. The specific activity was 550 g polyethylene/hr.g.V.kg/cm$^2$C$_2$H$_4$.

EXAMPLE 20

A cocatalyst was prepared as set forth in Example 19 except that the fluorinated alumina was suspended in Ti(OC$_2$H$_5$)Cl$_3$ at 135°C.

The elementary analysis of the cocatalyst showed that it contained 57 mg/g of titanium, 74 mg/g of chlorine and 41 mg/g of fluorine and had an atomic ration F+Cl/Ti of approximately 3.6.

After polymerization under the conditions set forth in Example 19, there was obtained 30 g of polyethylene having a melt index of 0.04 g/10 mins. The hourly productivity was 150 g polyethylene/g cocatalyst and the specific activity was 330 g polyethylene/hr.g-.Ti.kg/cm$^2$C$_2$H$_4$.

EXAMPLE 21

A cocatalyst was prepared as set forth in Example 19 except that the fluorinated alumina was suspended in CrO$_2$Cl$_2$ at 110°C.

The elementary analysis of the cocatalyst showed that it contained 81 mg/g of chromium, 97 mg/g of chlorine and 38 mg/g of fluroine. The atomic ratio F+Cl/Cr was approximately 3.

After polymerization under the conditions set forth in Example 19 there was collected 11 g of polyethylene with a melt index equal to 0.78 g/10 mins. The hourly productivity was 55 g polyethylene/g cocatalyst and the specific activity was 85 g polyethylene/hr.g.Cr.kg/cm$^2$C$_2$H$_4$.

EXAMPLE 22

An α-alumina monohydrate (boehmite) sold under the trade mark "KETJEN Grade B" was heated to and maintained at a temperature of 600°C for 16 hours.

100 g of the activated alumina thus prepared was placed in a 1-liter reactor. The reactor was then flushed with a stream of gaseous hydrogen chloride at 150°C and normal pressure for 15 minutes and there was obtained a chlorinated alumina which was then heated at 600°C for 4 hours in a furnace. After this treatment the chlorinated alumina was found to contain 544 mg/g of aluminium and 15 mg/g of chlorine. The atomic ratio of Cl/Al was therefore 0.02.

A cocatalyst was then formed using this chlorinated alumina and the procedure set forth in Example 1.

Elementary analysis of the cocatalyst showed that it contained 17 mg/g of titanium and 82 mg/g of chlorine. The atomic ratio Cl/Ti was approximately 6.5.

Polymerization was then carried out as set forth in Example 1 except that there was used 200 mg of cocatalyst, the partial ethylene pressure was 8 kg/cm$^2$ and the partial hydrogen pressure was 15 kg/cm$^2$.

35 g of polyethylene were collected possessing a melt index of 0.05 g/10 minutes. The hourly productivity was 175 g polyethylene/g cocatalyst and the specific activity was 1300 g polyethylene/hr.g.Ti.kg/cm$^2$ C$_2$H$_4$.

EXAMPLE 23

The procedure of Example 22 was carried out except that the alumina was treated with a stream of hydrogen bromide at 200°C for 5 minutes.

Elementary analysis of the brominated alumina showed that it contained 481 mg/g of aluminium and 92 mg/g of bromide. The atomic ratio Br/Al was approximately 0.155.

Elementary analysis of the cocatalyst showed that it contained only traces of bromine (less than 2 mg/g), 81 mg/g of chlorine and 15 mg/g of titanium. The atomic ratio Br+Cl/Ti was therefore approximately 7.2.

41 g of polyethylene were collected possessing a melt index of 0.01 g/10 minutes. The hourly productivity was 205 g of polyethylene/g cocatalyst. The specific activity was 1700 g polyethylene/hr.g.Ti.kg/cm$^2$ C$_2$H$_4$.

EXAMPLE 24

100 g of an alumina monohydrate (boehmite) sold under the trademark "KETJEN Grade B" was mixed with 7.8 g of NH$_4$F and the mixture brought to a temperature of 700°C. This temperature was maintained for 5 hours.

A fluorinated alumina was obtained whose aluminium content was 520 mg/g and whose fluorine content was 57 mg/g, corresponding to an atomic ratio F/Al of approximately 0.15.

A cocatalyst was then prepared as set forth in Example 1. The elementary analysis of the cocatalyst showed that it contained 6.2 mg/g of titanium, 26 mg/g of chlorine and 55 mg/g of fluorine. The atomic ratio of F+Cl/Ti was approximately 28.

100 mg of the cocatalyst were used to polymerize ethylene in a procedure identical to that set forth in Example 1. 137 g of polyethylene were collected having a high-load melt index of 0.29 g/10 mins. The hourly productivity was 1370 g polyethylene/g cocatalyst and the specific activity was 22,100 g polyethylene/hr. g. Ti.kg/cm$^2$C$_2$H$^4$.

This example shows that extremely active cocatalysts are obtained when starting with alumina hydrates and combining the activation treatment with the halogenation treatment.

It will be understood that it is intended to cover all changes and modifications of the examples of the invention herein chosen for the purpose of illustration which does not constitute departures from the spirit and scope of the invention.

What is claimed is:

1. Catalysts for the polymerization and copolymerization of α-olefins comprising an alkyl aluminum compound, and a cocatalyst consisting essentially of the reaction product of a heat-activated fluorinated alumina having an atomic ratio of fluorine/aluminum of 0.01 to 0.30 and a compound of titanium metal selected from chlorides, oxychlorides, alkoxychlorides and oxyalkoxychlorides, said alumina being activated by heat at a stage prior to reaction of the fluorinated alumina with the transition metal compound.

2. A process for the polymerization and copolymerization of α-olefins which comprises contacting the olefins, at a temperature and pressure sufficient to initiate the reaction, with a catalytic amount of the catalyst of claim 1.

3. Catalysts for the polymerization and copolymerization of α-olefins comprising an alkyl aluminum compound, and a cocatalyst consisting essentially of the reaction product of a heat-activated fluorinated alumina having an atomic ratio of fluorine/aluminum of from 0.06 to 0.30 and a compound of titanium metal selected from chlorides, oxychlorides, alkoxychlorides and oxyalkoxychlorides, said alumina being activated by heat at a stage prior to reaction of the fluorinated alumina with the transition metal compound.

4. The catalyst of claim 3 wherein the fluorinated alumina is activated by heating the fluorinated alumina at a temperature of between 300° to 900°C. for more than one hour and wherein the fluorine/aluminum atomic ratio is between about 0.1 to 0.15.

5. A process for the polymerization and copolymerization of α-olefins which comprises contacting the olefins, at a temperature and pressure sufficient to initiate the reaction, with a catalytic amount of the catalyst of claim 3.

6. Cocatalysts for use in catalyzing the polymerization and copolymerization of α-olefins consisting essentially of the reaction product of a heat-activated fluorinated alumina having an atomic ratio of fluorine/aluminum of from 0.06 to 0.30 and a compound of titanium metal selected from chlorides, oxychlorides, alkoxychlorides and oxyalkoxychlorides, said alumina being activated by heat at a stage prior to reaction of the fluorinated alumina with the transition metal compound.

7. The cocatalyst of claim 6 wherein the fluorinated alumina is activated by heating the fluorinated alumina at a temperature of between 300° to 900°C. for more than one hour and wherein the fluorine/aluminum atomic ratio is between about 0.1 to 0.15.

8. Cocatalysts for use in catalyzing the polymerization and copolymerization of α-olefins consisting essentially of the reaction product of a heat-activated fluorinated alumina having an atomic ratio of fluorine/aluminum of from 0.01 to 0.30 and a compound of titanium metal selected from chlorides, oxychlorides, alkoxychlorides and oxyalkoxychlorides, said alumina being activated by heat at a stage prior to reaction of the fluorinated alumina with the transition metal compound.

9. Catalysts for the polymerization and copolymerization of ethylene comprising a trialkyl aluminum containing from 4 to 12 carbon atoms, and a cocatalyst consisting essentially of the reaction product of a heat-activated fluorinated alumina having an atomic ratio of fluorine/aluminum of from 0.01 to 0.30 and an internal porosity higher than 1 cm$^3$/gm with titanium tetrachloride, said alumina being activated by heat at a stage prior to reaction of the fluorinated alumina with the titanium compound.

10. The catalyst of claim 9 wherein the fluorinated alumina is activated by heating the fluorinated alumina at a temperature of between 300° to 900°C. for more than one hour and wherein the fluorine/aluminum atomic ratio is between about 0.1 to 0.15.

* * * * *

UNITED STATES PATENT AND TRADEMARK OFFICE
CERTIFICATE OF CORRECTION

PATENT NO. : 3,978,031
DATED : August 31, 1976
INVENTOR(S) : Luigi Regimato, Charles Bienfait and Jacques Stevens It is certified that error appears in the above-identified patent and that said Letters Patent are hereby corrected as shown below:

Column 6, line 37, "molat" should read --molar--.
Column 7, line 39, "ration" should read --ratio--.
Column 8, line 12, delete "of";
         line 51, "specific" should read --special--;
         Table I, Ex. 5, line 2, "10" should read --16--;
                Ex. 3, line 3, "490" should read --496--.
Column 10, Table III, Ex. 14, line 11, "300" should read --360--.
Column 11, line 34, "solutions" should read --solution--;
          line 57, --was-- should be inserted after "ethylene".
Column 12, line 41, "ration" should read --ratio--.
Column 13, line 30, "bromide" should read --bromine--;
          line 62, "$C_2H^4$" should read --$C_2H_4$--.
Column 14, line 2, "does" should read --do--.

Signed and Sealed this

Sixteenth Day of November 1976

[SEAL]

Attest:

RUTH C. MASON
*Attesting Officer*

C. MARSHALL DANN
*Commissioner of Patents and Trademarks*